US008485891B2

(12) United States Patent
Schugar

(10) Patent No.: US 8,485,891 B2
(45) Date of Patent: *Jul. 16, 2013

(54) WAGERING GAME WITH PLAYER BANKING OF POSITIVE EXPECTATION SITUATIONS

(76) Inventor: David Schugar, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,234

(22) Filed: Jan. 31, 2011

(65) Prior Publication Data

US 2011/0212763 A1 Sep. 1, 2011

Related U.S. Application Data

(63) Continuation of application No. 11/158,919, filed on Jun. 22, 2005, now Pat. No. 7,909,694, which is a continuation-in-part of application No. 10/754,587, filed on Jan. 12, 2004, now Pat. No. 8,096,865, which is a continuation-in-part of application No. 10/410,448, filed on Apr. 10, 2003, now Pat. No. 7,294,054, said application No. 11/158,919 is a continuation-in-part of application No. 10/874,558, filed on Jun. 24, 2004, now Pat. No. 7,354,343, and a continuation-in-part of application No. 10/688,898, filed on Oct. 21, 2003, now Pat. No. 7,163,458.

(60) Provisional application No. 60/548,481, filed on Feb. 26, 2004.

(51) Int. Cl.
*G06F 17/00* (2006.01)

(52) U.S. Cl.
USPC ........................................................ 463/25

(58) Field of Classification Search
USPC ................................................ 463/16–25
See application file for complete search history.

(56) References Cited

U.S. PATENT DOCUMENTS

| | | | | |
|---|---|---|---|---|
| 7,144,012 | B2 * | 12/2006 | Grigsby | 273/292 |
| 7,758,421 | B2 * | 7/2010 | Hornik et al. | 463/25 |
| 2010/0291993 | A1 * | 11/2010 | Gagner et al. | 463/25 |

* cited by examiner

*Primary Examiner* — Ronald Laneau
(74) *Attorney, Agent, or Firm* — Muskin & Cusick LLC

(57) ABSTRACT

A method, apparatus, and computer readable storage to implement a disbursement of potential awards in a wagering game that have not been fully awarded yet. In a wagering game that comprises multiple states, a value of a favorable state relative to a prior state can be banked for later redemption by a player.

12 Claims, 4 Drawing Sheets

WAGERING GAME WITH PLAYER BANKING OF POSITIVE EXPECTATION SITUATIONS

CROSS REFERENCE TO RELATED APPLICATIONS

This application is a continuation application of application Ser. No. 11/158,919, filed in the USPTO on Jun. 22, 2005 now U.S. Pat. No. 7,909,694, entitled, "Wagering Game with Player Banking of Positive Expectation Situations" which itself is both A) continuation in part of application Ser. No. 10/754,587, filed on Jan. 12, 2004 now U.S. Pat. No. 8,096,865, entitled, "Casino Games Directed to Betting on Progressions," which is a continuation in part of application Ser. No. 10/410,448, filed on Apr. 10, 2003 now U.S. Pat. No. 7,294,054, entitled, "Wagering Method, Device, and Computer Readable Storage Medium, for Wagering on Pieces in a Progression," all three of which are incorporated by reference herein in their entirety for all purposes; and B) a continuation in part of application Ser. No. 10/874,558, filed on Jun. 24, 2004 now U.S. Pat. No. 7,354,343, entitled, "Wagering Game Where Player Can Borrow Money for Wagers Based on Equity Position" which is incorporated by reference in its entirety for all purposes and 1) derives priority from the provisional patent application entitled, "Wagering Game Where Player Can Borrow Money Based on Positive Expectation," filed on Feb. 26, 2004, Ser. No. 60/548,481, which is incorporated by reference herein in its entirety for all purposes and 2) is also Continuation in Part (CIP) of patent application Ser. No. 10/688,898, filed on Oct. 21, 2003 now U.S. Pat. No. 7,163,458, entitled, "A Casino Game for Betting on a Bidirectional Linear Progression," which is incorporated by reference herein in its entirety for all purposes.

BACKGROUND OF THE INVENTION

1. Field of the Invention

The present invention is directed to a method, apparatus, and computer readable storage medium directed to banking of player equity in a wagering game for later disbursement to the player.

2. Description of the Related Art

Wagering games are a multi billion dollar industry. Typically, when a player has achieved a measure of success in a game he or she is playing, the player is required to complete the game and cash out.

What is needed is a way in which a player can "bank" or accumulate his or her current success in a game for later use.

SUMMARY OF THE INVENTION

It is an aspect of the present invention to provide a method, apparatus, and computer readable storage to provide a player with an opportunity to save his or her success in a game for later use.

The above aspects can be obtained by a method that includes (a) conducting a wagering game having a valuable game state; (b) determining that the valuable game state has a positive expectation for the player; (c) converting the valuable game state into a devalued game state; (d) storing a value based on a difference between the valuable game state and the devalued game state for later redemption by the player; and (e) continuing the wagering game.

The above aspects can also be obtained by a method that includes (a) conducting a wagering game having a first game state; (b) determining that the first game state has a positive expectation for the player; (c) allowing the player to convert the first game state into a second game state, the second game state having a player expectation less than the first game state; and (d) crediting the player a value based on the different between the second game state and the first game state.

The above aspects can also be obtained by a method that includes (a) receiving a wager for a wagering game on a first state; (b) progressing the wagering game from the first state to a second state; (c) determining that the second game state has a better expectation for the player than the first state; (d) automatically reducing the wager by a reduction amount; and (e) automatically accumulating an amount based on an expected wager value of the reduction amount for later redemption.

The above aspects can also be obtained by a method that includes (a) receiving a wager for a wagering game on a first state; (b) progressing the wagering game from the first state to a second state; (c) determining that the second game state has a better expectation for the player than the first state; (d) automatically reducing the wager by a reduction amount; and (e) placing an additional wager using an amount based on the reduction amount.

The above aspects can also be obtained by a method that includes (a) receiving a pre-condition, a conditional wager amount, and a conditional wager event; (b) progressing a wagering event; (c) evaluating if the pre-condition occurs during the wagering event; (d) if the pre-condition occurs: determining if the conditional wager event occurs during the wagering event; (f) if the conditional wager event occurs, then the player wins an amount based on the conditional wager amount; and (g) if the conditional wager event did not occur, then the player loses the conditional wager amount.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
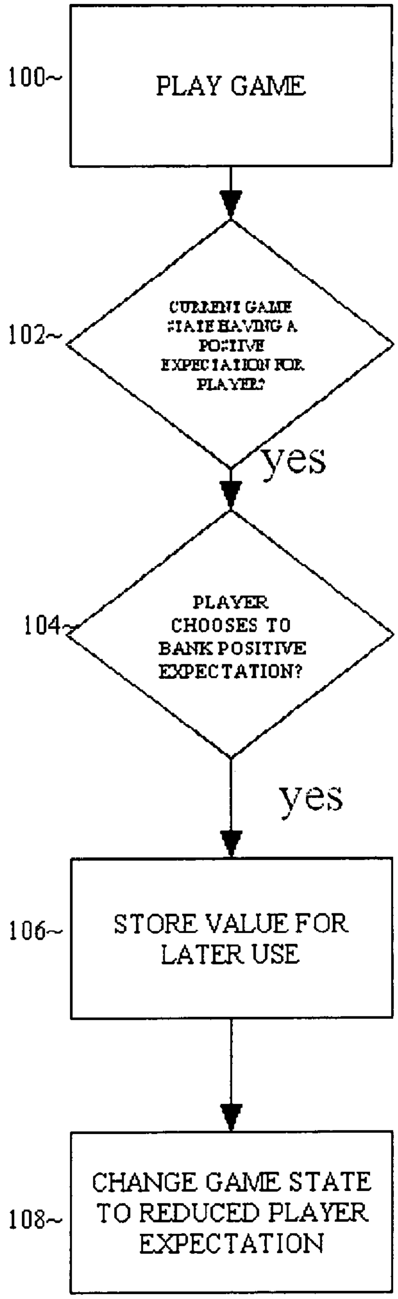
FIG. 1 is a flowchart illustrating an exemplary method of storing positive expectations for later use, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage to allow a player to bank his or her current success in a game for later use.

When the player is playing a game in which the player can be "winning" before the game is over, the player may wish to have a way to cash in on the winning state before completing the game. For example, if a player bets on a particular horse in a horse race, and the particular horse is winning, the player has some satisfaction (at least for the moment) that the player is in a good position. Of course, the player's horse can lose and the player can be left with nothing. A player may find it attractive to be able to accumulate (or "bank") a portion of a positive expectation situation for later redemption. In this manner, even if the player ultimately loses his or her wager, the player has not lost everything because the banking has been performed.

For example, consider a $100 craps wager on the Don't Pass line. Since the house edge on the Don't Pass line is 1.364%, the expected value of the player's wager is $98.64. The dice are rolled and the come out roll is a 10. The player is now happy, as the player wins if the shooter rolls a 7 and loses if the shooter rolls a 10 (any other total the shooter keeps rolling). Of course, it is easier for the shooter to roll a 7 than a 10. The probability of the shooter rolling a 7 before a 10 is 66%. Thus, the expected win is $133.33. Of course, the player can still lose the wager if the shooter rolls a 10. The player can surrender his craps bet for $133.33 or a lesser amount (so that the house takes a commission). For example, the house can let the surrender the wager for $125. The house makes money on this proposition, and the player gets the piece of mind of the sure win.

The player can also bank a portion of the expected profit the player has earned for later use. This can be done in a number of ways. The player can receive a $33.33 amount (or an amount based on this such as a lesser amount such as $25 to account for a house commission) and the point can be reset so that the game is in the previous game state with the $100 still wagered on the Don't Come line. Alternatively, the house can take a portion of the player's wager (such as 10%), so that the player now has $90 on the Don't Pass line. The taken portion can be stored for later redemption by the player. The $10 taken actually has an expected value of $13.33. This $13.33 (or a number based on this to account for the house commission) can be accumulated and disbursed to the player at a later time (either later at the instant game, or later at another game, or by electronic redemption). If the shooter rolls a 7, the player then wins $90 and if the shooter rolls a 10 the player loses his wager. However, in both cases, the player has banked the banked value for a later redemption. In this way, the player can continue to wager, but limit his losses by ensuring that some amount is still saved for later.

Consider a bilinear progression type game wherein a player can bet on a puck reaching a left side or a right side; the game has five spots numbered from left to right: −2, −1, 0, +1, +2 for the puck (not including an area to the left of spot −2 when the left side has won and an area to the right of spot +2 when the right side has won); the puck starts on spot 0; a die is rolled to determine whether to move left or right, the die has six sides: −2,−1,−1,+1,+1,+2; from spot −2, left pays 1:5 and right pays 4:1; from spot −1, left pays 1:2 and right pays 9:5; from spot 0 left pays 19:20 and right pays 19:20; from spot +1 left pays 9:5 and right pays 1:2; from spot +2 left pays 4:1 and right pays 1:5. It is noted that these rules are just exemplary and of course any other set of rules/parameters could be used as well.

If the puck is on spot +2 and a $10 wager is placed on the left side, and then the die is rolled results in a −2, the puck is now on spot 0. The player now has an expected profit of $15. This can be computed by multiplying the probability of reaching the left side (50%) by the total win of the left side ($50), and then subtracting the original wager amount ($10). The player may wish to "bank" this expected profit for later use. If the player wishes to bank this amount (or a fraction of this amount), the game state should be adjusted back to remove the amount of player advantage that is banked for later use.

Thus, for example, if the player wishes to bank his or her $15 expected profit, the game state can return to the previous state (e.g. the puck is at +2 with a $10 wager on the left side). This state is less desirable to the player, since the player has no expected profit here. In exchange, the player has banked the $15 in expected profit for later use.

The expected profit banked for later use can be used in a variety of ways. The $15 in the above example can be redeemed by the player for cash. The $15 can also be used to buy positive game states at a later time. For example, if the player is playing a game with multiple game states, and the player wants to put himself in a more favorable state, the player can use the banked money to buy a better state. A value stored for later use can also be applied towards room, food and beverage bills, etc. The value stored for later use can also be redeemed for cash at a later time. The value can also be redeemed for cash instantly, and the redeemed cash can be immediately returned to the player's current credit meter. The value stored for later can be stored locally and/or on a database which can be accessed at a later time.

As a further example, when a player achieves a positive expectation (or profit) in a game, the player can be alerted and/or presented with a pop up window which can make an offer such as, "would you like to revert to the previous game position and receive a free lunch at the buffet worth $15?"

The player can use value stored to purchase better game states than the player currently has. For example, if the player's current game state has a current value of $20, then when the game state is advanced (e.g. rolling of a die, spinning a wheel, generating random numbers on a computer, etc.) the game has a current value of $10 (the new game state was unfavorable to the player compared to the previous game state). The player can use value that the player has banked at a previous time to purchase the better ($20) game state, or any other game state which is improved over the current game state. So for example, if the player has banked a $15 value for later use, and the player has just lost $10 in his or her current game state, the player can apply $10 of stored value to put the game state back to the previous state before it lost $10 in value. The player would then have $5 value remaining which can be used later on for further such transactions.

FIG. 1 is a flowchart illustrating an exemplary method of storing positive expectations for later use, according to an embodiment.

The method can start with operation 100, which plays a wagering game. The wagering game should be one which has multiple game states, either discrete (each successive game state is prompted and advanced by the player) or continuous (the game automatically advances throughout game states until a player takes an affirmative action to freeze the current game state and take action).

The wagering game can be any wagering game with multiple game states, including but not limited to any of the games described herein or in prior documents incorporated by reference.

The method can continue to operation 102, which determines whether the current game state has a positive expectation for the player. If the current game state has a positive expectation for the player, then the player has "equity" in the game.

The player's expectation in a game can be determined in numerous ways, such as:

For all outcomes, Σ(probability of outcome * reward for the outcome).

The previous amount can also be subtracted by the current amount wagered to determine an expected profit in the current game situation. Either the expectation or expected profit can be used in the computations described herein.

If the current game state has a positive expectation (or positive expected profit) for the player, then the method can proceed to operation 104, which then determines whether the player chooses to bank his or her positive expectation. This can be prompted by an automatic pop up window which allows the player to choose whether he wishes to bank some or all of his recent gains in expectation for later redemption (with a return of the game state to the prior or other position with lesser expected value than the current state). The player can also exercise this option either verbally to a live dealer or electronically with a press of a button which allows the player to bank his or her positive expectation.

If the player chooses in operation 104 to bank his or her positive expectation, then the method can proceed to operation 106, which stores the value the player has banked for later use. This can be stored in the current machine and/or a remote database for later retrieval. A player can bank his or her positive expectation for later retrieval when the player is playing a same or different game at a later point in time.

Either the player can select how much positive expectation to bank, or the machine can automatically calculate an amount of positive expectation to bank. For example, one way to calculate the amount of positive expectation to bank is the amount of positive expectation the player has gained from the previous game state.

From operation 106, the method can proceed to operation 108 which changes the game state to a game state with a reduced positive expectation for the player. The difference in expectation between the changed state and the prior state can be based on the value stored in operation 104. For example, the game state can revert to the prior game state before the last state change, and the value stored can be based on the difference in expected value between the two states.

The value stored can also be adjusted for a house commission. For example, if the player is at game state A (with an expected profit of $15), and the game progresses to game state B (with an expected profit of $25), then the player may wish to bank $10 for later use. The game state can then return to game state A, with $10 added to the player's stored banked value. The $10 can be multiplied by a house commission, for example 0.90. Thus, $9 can be stored for later use by the player.

Thus, by implementing the method as exemplified in FIG. 1, a player can play a multiple state game and bank value for later use. The player may end up losing instant money on a final result of the multiple state game, but nevertheless may have accumulated value which he or she banked for later use in which the overall play for the player may be considered profitable (for example exceed the player's total investment in that game).

In exchange for storing a value redeemable for later use, the value can also be an award of a non-monetary award. For example, a player may receive a free meal, room, or any type of room, food, or beverage credit. For example, after a game state is changed to a more favorable position, and the different between the two positions is worth a value comparable to a free meal at the buffet, a pop up screen may appear, "Player—press this button if you would like to revert to your previous game state and receive a free meal at the buffet." If the player takes advantage of the offer, then the award (such as a free meal) can be mailed to the player or the player can redeem the award in person (e.g. at the buffet counter, a casino host, etc.) The marketing computer can store the fact that the player has won the award.

In a further embodiment, a cumulative value of saved awards can be redeemed at a later time for a higher amount than originally earned. For example, if a player earns $10 during a game to be stored later, the $10 can be redeemed at a later point in time (e.g. the next day, a month later, a year later, or any amount of time) for $11 (or any multiple). In this way, a player may be encouraged to return to the casino at a later time since there will be more money waiting for the player than he or she originally accumulated. Alternatively, saved awards can be redeemed for lower amounts as well. This may be so that the house can take a commission from these transactions. It is up to the casino's preferences to determined whether saved awards can be redeemed at a higher, lower, or same cash value as when they were banked.

Saved awards may also be used to purchase additional game positions. In a binlinear progression type game mentioned above, if the player made a $5 bet on the right side at the −2 position and the puck is currently on the +2 position, the expected profit of the game is approximately $15 with a net win of $20 on the right side. The player may "buy" a roll of +1, thereby resolving or concluding the progression and winning the game, for $5, effectively winning the player $15 after considering the $5 buy-in. This can also be considered similar or equivalent to "surrendering" (or "retreating") the wager in this circumstance, but buying puck moves does not necessarily have to make the player a winner. Puck positions can also be "surrendered" (or "retreated", "sacrificed", or "relinquished") to less valuable positions for the player, in which the player can bank the value of such unfavorable changes in game state.

In yet a further embodiment, when a player achieves a positive change in his or her expectation, a portion of the increased expectation can be automatically banked for later redemption.

For example, consider the bilinear progression game described above. Since the current state (the puck on 0) has an increase in expected profit of $15 from the previous state (when the puck is on 2), the machine can automatically bank a portion (e.g.) 10% of a wager with a positive expected value for later use. Thus, the machine can deduct 10% of the $10 wager ($1) to leave a $9 wager on the left side. The $9 wager on the left side results in a net left win of $36. The expected profit is now 90% of $15 or $13.50. Thus, $2.50 can be banked for later use since this is the expected value of the $1 wager that was removed. The $2.50 is computed by (50% chance of winning on the left side) * $5 (win resulting from the $1 including the original $1 wager). Thus, by automatically removing $1 from the wager that has a positive expectation, the player can bank $2.50 for later use (in any manner described herein).

Figure 2:
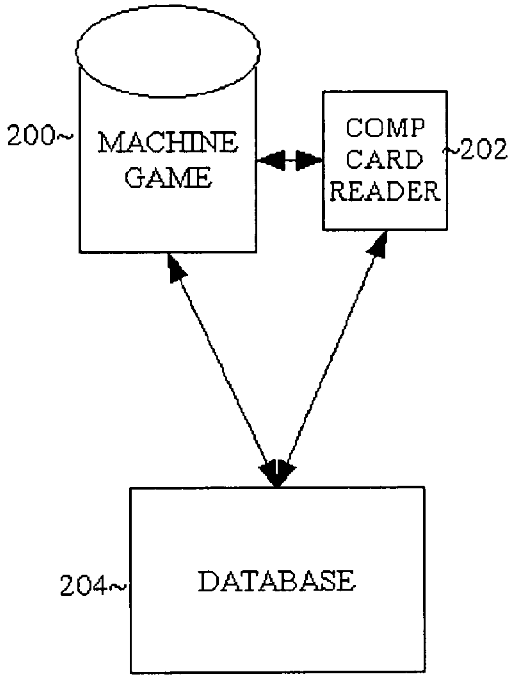
FIG. 2 is block diagram illustrating an exemplary set of components in order to implement an embodiment.

FIG. 2 is block diagram illustrating an exemplary set of components in order to implement an embodiment.

A machine game 200 can be any wagering machine game, such as a slot machine, video poker machine, or machine game which plays any game which can have multiple states (e.g. games which a player can wager on a progression). The machine game 200 can be associated with a comp card reader 202 in which the player can use his or her comp card to identify the player.

A database 204 can be used to store values banked for later use. The database 204 can be accessible by all games in an individual casino or a group of casinos. Value banked for later use can be stored in the database using the player record.

It is further noted that the methods described herein (which includes the methods described in the Ser. No. 10/874,558 document) can be applied to all games, including live table games or live sporting events, described herein (which includes the games described in the Ser. Nos. 10/754,587, 10/410,448 and Ser. No. 10/688,898 documents). For example, in any progression type game with multiple states, a player may borrow (or be provided with a bonus with playable credits) money from the house to place guaranteed winning wagers. In some games it may be necessary to make multiple wagers in order to guarantee a win. For example, in a progression game with 3 pieces (A, B, C) in a race or chase to win, if a player has wagered on piece A and is in a positive expectation situation (the player has equity), the player may need to wager on both pieces B and C in order to guarantee a winning position. The house can loan the player the money to place these wagers in order that the player is guaranteed to win.

In a further embodiment, a conditional wager can be placed. A conditional wager is a wager that is placed if a particular pre-condition event happens, and then a conditional wager amount is placed on a conditional wager event. For example, a bettor may wish to place a conditional wager on a Yankees/Braves game. The player wishes to bet $10 that the Yankees will win on the pre-condition that the Yankees are ahead at the end of the fifth inning. The $10 is a conditional wager amount and a Yankee win is the conditional wager event. If the Yankees are not ahead at the end of the fifth inning, then the conditional wager is not placed.

Figure 3:
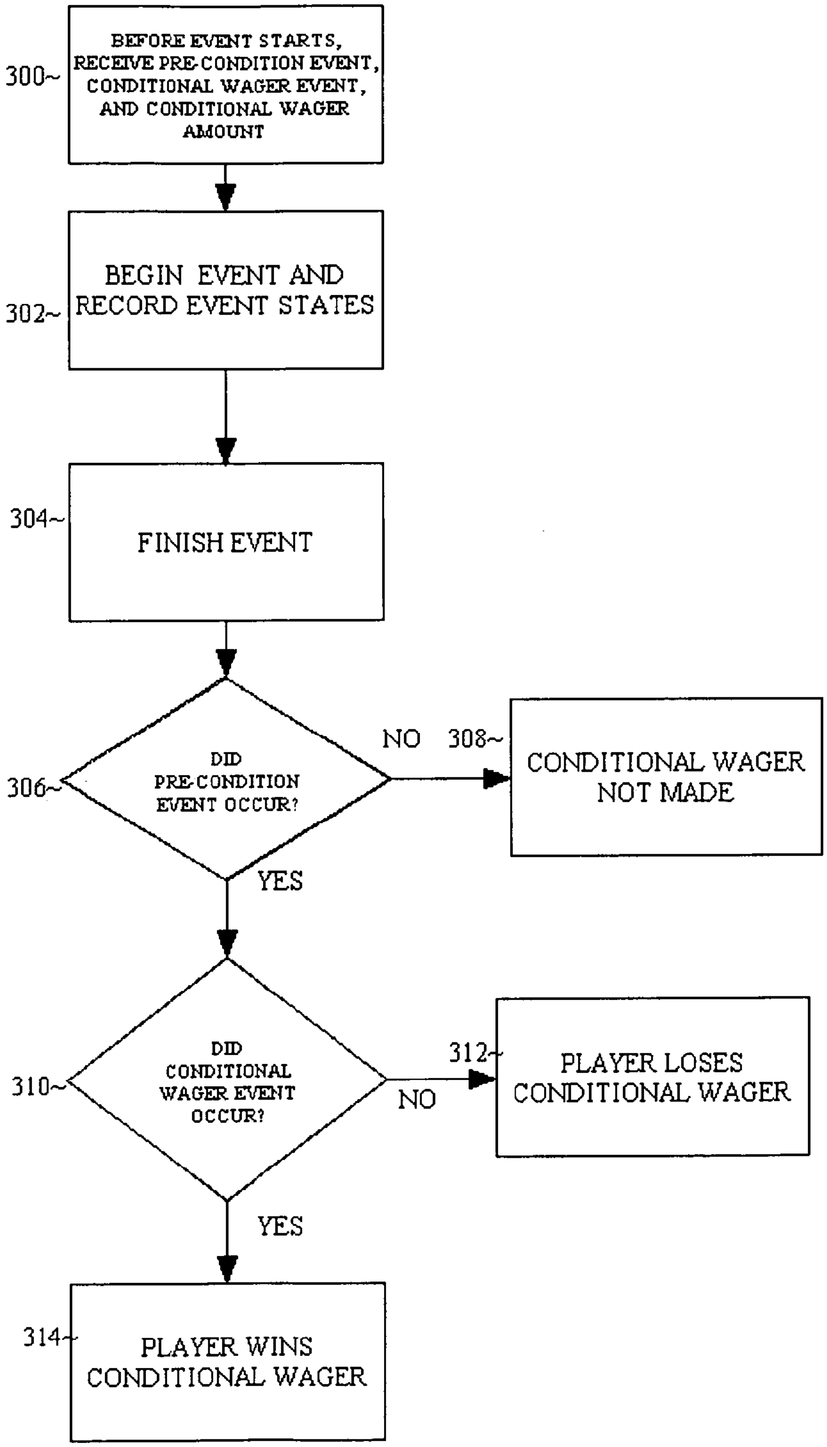
FIG. 3 is a flowchart illustrating an exemplary method of making a conditional wager, according to an embodiment.

FIG. 3 is a flowchart illustrating an exemplary method of making a conditional wager, according to an embodiment.

The method can start with operation 300, wherein before the event starts, a pre-condition event is received, as well as a conditional wager event and a conditional wager amount. The pre-condition event may also include a time period for the pre-condition, which may be either an actual time (e.g. 1 pm, 4 minutes left in the game, etc.) or a discrete segment of an event (e.g. after the fifth inning, at halftime, etc.) The payout odds for the conditional wager event may be known when the conditional wager is placed (typically before the event) or may not be known at the time the conditional wager is placed. The event may be a sporting event (including horse racing, football, etc., simulated by machine or real), a gambling game (e.g. craps, blackjack, etc.), or even a dramatic work (such as a reality show).

From operation 300, the method can proceed to operation 302, which begins the event and records the event states. The event states can be recorded on a digital media, on video capture, etc.

From operation 302, the event can proceed to operation 304, which finishes the event.

From operation 304, the method can proceed to operation 306, which determines whether the pre-condition occurred. If the pre-condition did not occur, then the method can proceed to operation 308, wherein the conditional wager is not made. The amount for the conditional wager may be returned in its entirety, or the house may get a commission on the wager even though it was technically not "in action."

If the determining in operation 306 determines that the pre-condition occurred, then the method can proceed to operation 310 which determines whether the conditional wager event occurred. The conditional wager event is the actual event that the player hopes to occur in order to win the conditional wager. This can be whether a particular team or horse wins an event, a proposition wager within that event, or any outcome that the player has wagered on.

If the determining in operation 310 determines that the conditional wager event did not occur, then the method proceeds to operation 312 wherein the player loses the conditional wager.

If the determining in operation 310 determined that the conditional wager event has occurred, then the method proceeds to operation 314 wherein the player wins the conditional wager. The payouts (odds) for the conditional wager may be determined before the event, or they may be determined after the event using for example pari-mutuel determined odds.

It is noted that the operations in FIG. 3 can be performed in any order. For example, operations 306-308 can be performed before operation 304 (when the event ends).

An advantage of participating in conditional wagering is that the bettor may be able to put himself in a no-lose situation if the pre-condition occurs. For example, consider a two horse horserace with the horse A as a 9:1 long shot and horse B paying 9:10. A bettor wagers $100 on horse A to win the race. The bettor also makes a conditional wager, the pre-condition being that horse A be in the lead at the half-way point and the conditional wager event is that horse B wins the overall race (the odds of B winning should typically be determined based on the conditions at the halfway point).

The conditional wager amount can be set by the player or can be automatically determined to be an amount necessary to guarantee the player a win. At the halfway point, odds can be determined for the outcomes. This can be done on a pure mathematical basis (if the event is determined purely by chance), on a pari-mutuel basis, using a handicapper, or any other method. If the payout for B winning is 5:1 (since A is in the lead it is more unlikely for B to win now), then since there are only two horses in this example the probability of B winning (based on the payout assuming no house commission for simplicity) is approximately 17% (1/6) and the probability of A winning is 83% (100%-17%). A $100 wager on B would pay $600. Since the player had wagered $100 for A to win and the payout for this bet is $1000 (at 9:1), the expectation of this wager is 0.87*$1000=$870. $10 can now be removed from the original wager amount of $100 on horse A to result in a $90 on horse A, and this frees up $87 (10/100)*870 to place an additional wager. In other words, the current payouts based on the current state can be used to determine a current value of already placed wagers. The additional wager can now be on horse B which is now paying 5:1, which thus pays $600 if horse B now wins, although of course the player would lose his original wager on A. If horse A wins, the player has won $783. The exact amount can be chosen by the player, can be randomly determined, can be calculated to be the minimum amount required to put the player in a break even position, or can be (automatically or manually) chosen to spread the player's equity over both sides.

Thus, using conditional wagering, the player may be able to put himself into a guaranteed winning condition if the player's precondition(s) are met and the payout odds are such that they can support such guaranteed wagers.

In a further embodiment, a player can use equity in a current wager in order to place an additional wager. For example, before the game, a bettor may bet $100 that the Yankees will beat the Braves outright in an even money bet (+100 moneyline). After the fifth inning, the Yankees are winning by 4 runs. At that point in time, the bettor has equity in his wager. The wager has equity in that the bettor may not be guaranteed to win but he or she has a positive expectation in the wager based on the current game state. The probability of the bettor winning his or her wager multiplied by the win amount is greater than the initial wager itself. If a pari-mutuel system (or a handicapper) at that point determines that that the Yankees now have a 66% chance of winning the game, the expected value of the bettor's wager is now effectively $132. The bettor may wish to use equity in his or her wager to place further wagers. The player may wish to use $1 of that amount and make a second wager, for example on a proposition that the game will go into extra innings. A $1 amount is actually worth $1.52 of the first wager ($1/0.66). Therefore, $1.52 can be subtracted from the $100 original wager to result in a $98.48 wager remaining on the Yankees. Now $1 is freed up for a second wager. It is also noted that the player need not be in a positive expectation situation in order to utilize the method of cashing in value for a current wager in progress in order to place a second wager. However, a bettor in a positive expectation situation may be more eager to make further bets when he or she is winning their current wagers.

Figure 4:
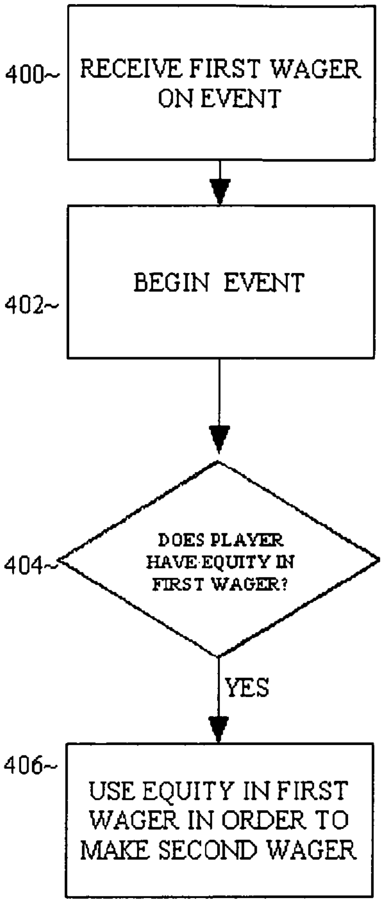
FIG. 4 is an exemplary flowchart illustrating a method of using equity in a first wager in progress in order to fund a second wager, according to an embodiment.

FIG. 4 is an exemplary flowchart illustrating a method of using equity in a first wager in progress in order to fund a second wager, according to an embodiment.

The method can start with operation 400, which receives a first wager on an event. The event can be a sporting event, a gambling game (e.g. card game etc.), or any event that bettors have placed wagers on in the prior art.

From operation 400, the method can proceed to operation 402, which begins the event and progresses a portion of the event (but the event is not over yet).

From operation 402, the method can proceed to operation 404, which determines whether the player has equity in the first wager. The player has equity if the player's expected profit is greater than 0, or if the player's expected winnings is greater than the initial wager.

If the determining in operation 404 determines that the player has equity in the first wager, the method can proceed to operation 406, wherein the player can use some or all of his or her equity in order to make a second wager. The portion of the first wager used for the second wager can be "surrendered" (or "relinquished" or "withdrawn") based on its current value so it can be used for the second wager. The amount of the first wager used for the second wager can be considered a reduction amount. The reduction amount can be for example a percentage of the first wager, a fixed amount, a user-selected amount, etc.

An advantage of doing this while the bettor has equity in the first wager is that the bettor can put himself into a no-lose situation. For example, consider a football game with the Patriots vs. the Giants. The Patriots are a +900 long shot. A bettor wagers $100 on the Patriots. At halftime, the Patriots are winning by +28 points. At this point, a pari-mutuel halftime betting pool determines that the Giants are now a +1000 long shot. Assuming no house commission for simplicity, a +1000 translates into a 10% probability of occurrence of the Giants winning. Thus, the bettor has a 90% chance of winning $900, thus the effective value of the original wager is now 0.90*900=$810. The bettor can now surrender $10 of his original wager which is effectively worth $81. This $81 can now be wagered on the Giants which would result in a $810 win if the Giants win. The player now has $90 wagered on the Patriots for a win of $810 if the Patriots win. Thus, the player is in a no-lose situation and can relax and enjoy the game without worry.

It is further noted that operation 404 is optional, and in fact, even if the player is in a negative expectation situation, the player can still utilize the method described herein of cashing out a portion of a current bet in progress in order to pay for an additional wager.

In yet a further embodiment, a wager can be placed on a horse in a horse race to beat another horse, but irrespective of where the horses involved in the bet actually finish in the race. For example, consider a race with horses A, B, C, D, and E. A player can wager that horse A will beat horse D to the finish line, but it does not matter whether horse A (or D) wins the race or where they finish. The payouts for such a bet can be determined using any known method of determining payouts (e.g. pari-mutuel, etc.) This type of wager can also be applied to other events as well, such as whether player A may score higher than player B in a tournament (e.g. tennis, Texas-Holdem, etc.) irrespective of whether these players actually win the tournament.

It is further noted that any of the games/methods described herein can be applied with a "reverse" feature. For example, when a hunter piece (a piece that is chasing a hunted piece) is moving around a track, the hunter piece can change directions. This can be triggered in a number of different ways, such as by a random number generator, by the hunger piece reaching a certain location, etc. Thus, for example, if hunter pieces X and Y are chasing hunted piece A around a circular track, piece X may suddenly change direction and continue in the opposite direction in the hunt for piece A. In a further embodiment, more than one piece, or all pieces, can change direction (which can include both a hunter piece and a hunted piece).

It is a further feature that any of the games/methods described herein can accommodate an "escape" feature. If a hunter piece is hunting two hunted pieces, the two hunted pieces may manage to escape from the playing field. For example, if the hunted pieces get too far away from the hunter piece, or if one or more hunted pieces reaches a certain location, or by use of a random number generator. If the hunted pieces escape, then the game results in a tie or a further bonus game can be initiated.

It is noted that the methods described herein can also apply to table games in a similar manner as described herein with regard to machine games.

It is also noted that any and/or all of the above embodiments, configurations, variations of the present invention described above can mixed and matched and used in any combination with one another. This also includes any prior document incorporated by reference, and any feature described herein can also be applied to any such documents. Any claim herein can be combined with any others (unless the results are nonsensical). Further, any mathematical formula given above also includes its mathematical equivalents, and also variations thereof such as multiplying any of the individual terms of a formula by a constant(s) or other variable.

Moreover, any description of a component or embodiment herein also includes hardware, software, and configurations which already exist in the prior art and may be necessary to the operation of such component(s) or embodiment(s). The embodiments described herein can be applied to any type of gaming machine (e.g. class II, class III, etc.) Random numbers can be generated instantly at the local level, or generated and stored at a central server and served to local machines.

Further, the operations described herein can be performed in any sensible order. Any operations not required can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, the method comprising:

receiving a wager from a player on an electronic machine, the electronic machine comprising a processing unit, a video output device and an input device;

conducting a wagering game on the electronic machine having a first game state;

determining, on the electronic machine, that the first game state has a positive expectation for the player;

allowing the player, on the electronic machine, to convert the first game state into a second game state upon receiving a request by the player , the second game state having a player expectation less than the first game state; and crediting, on the electronic machine, the player a value based on the difference between the second game state and the first game state.

2. A method as recited in claim 1, wherein the crediting credits the player's machine instantly.

3. A method as recited in claim 1, wherein the crediting stores the value on a database for later redemption.

4. A method as recited in claim 1, wherein the allowing comprises providing the player a pop up screen displaying the opportunity to revert to the first game state in exchange for the value.

5. A method as recited in claim 1, wherein the value is a non-monetary award offered by a casino.

6. A method as recited in claim 1, wherein the value can be redeemed for a higher value greater than the value after a predetermined time passes.

7. A method of banking value in a game in progress for a player, the method comprising:

receiving, on an electronic machine, a wager for a wagering game on a first state, the electronic machine comprising a processing unit, a video output device and an input device;

progressing, on the electronic machine, the wagering game from the first state to a second state;

determining, on the machine, that the second game state has a better expectation for the player than the first state;

automatically reducing the wager by a reduction amount on the machine; and automatically accumulating an amount, on the machine, based on an expected wager value of the reduction amount for later redemption.

8. A method as recited in claim 7, wherein the amount for the player can be redeemed for cash.

9. A method as recited in claim 7, wherein the amount for the player can be redeemed during later wagering.

10. A method of wagering, the method comprising:

receiving a wager from a player, on an electronic machine, for a wagering game on a first state, the electronic machine comprising a processing unit, a video output device and an input device;

progressing, on the electronic machine, the wagering game from the first state to a second state;

determining, on the electronic machine, that the second game state has a better expectation for the player than the first state;

reducing the wager by a reduction amount on the electronic machine; and receiving from the player, on the electronic machine, an additional wager using an amount based on the reduction amount.

11. A method of wagering, the method comprising:

receiving, on an electronic machine, a pre-condition, a conditional wager amount, and a conditional wager event, the electronic machine comprising a processing unit, a video output device and an input device;

allowing a wagering event to progress;

evaluating, on the electronic machine, whether the pre-condition occurs during the wagering event;

providing the following rules:

a) if the pre-condition occurs then performing operations b), c), and d);

b) determining, on the electronic machine, if the conditional wager event occurs during the wagering event;

c) if operation b) determines that the conditional wager event occurs, then the condition wager amount wins and paying the player on the electronic machine an amount based on the conditional wager amount;

d) if operation b) determines that the conditional wager event did not occur, then the conditional wager amount loses and the conditional wager amount is taken from the player on the electronic machine; and implementing the rules.

12. A method of wagering, the method comprising:

receiving from a player, on an electronic machine, a wager that a selected piece will finish a game first out of a plurality of pieces, the electronic machine comprising a processing unit, a video output device and an input device;

displaying and advancing, on the electronic machine, the game using the plurality of pieces;

determining, on the electronic machine, that if the player places a bet on a particular piece out of the plurality of pieces then the player would be a guaranteed winner, and automatically advertising the bet to the player and allowing the player to automatically place the bet;

completing the game on the electronic machine;

resolving the wager on the electronic machine; and resolving the bet, when made, on the electronic machine.

* * * * *